W. WESTLAKE.
Lantern.
No. 2,337.
Reissued Aug. 14, 1866.
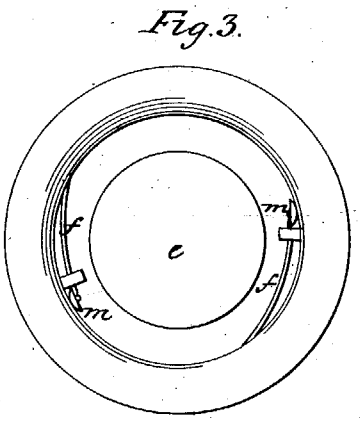
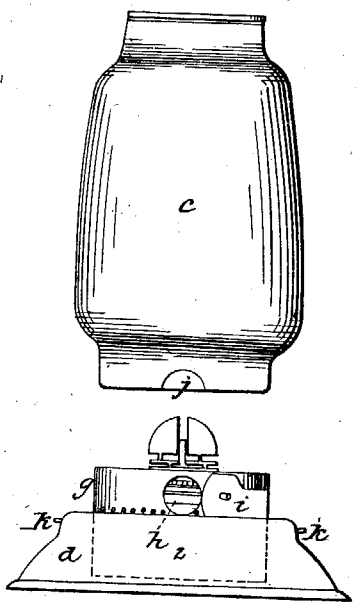
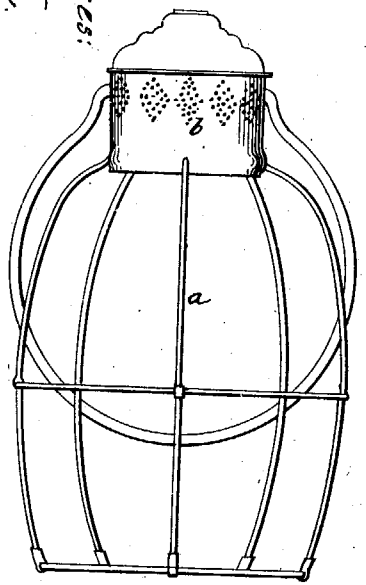
Witnesses:
S. Smith
L. Jones.
Inventor:
Wm Westlake
by Atty Thos. P. Lowrey
N. PETERS, Photo-Lithographer, Washington, D. C.

UNITED STATES PATENT OFFICE.

WILLIAM WESTLAKE, JAMES E. CROSS, AND JAMES F. DANE, OF CHICAGO, ILLINOIS, ASSIGNEES OF WILLIAM WESTLAKE.

IMPROVEMENT IN LANTERNS.

Specification forming part of Letters Patent No. 48,858, dated July 18, 1865; Reissue No. 2,337, dated August 14, 1866.

*To all whom it may concern:*

Be it known that I, WILLIAM WESTLAKE, of the city of Chicago, in the State of Illinois, have invented a certain new and useful Improvement in Kerosene-Lanterns; and I do hereby declare that the following is a full, clear, and exact description thereof, reference being had to the accompanying drawings, and to the marks and letters therein.

It will be seen by reference to the drawing, which forms part of this specification, that the guard is attached at its upper part to the dome of the lantern, and is detachable from the other parts of the lantern as one piece with the dome, having the glass or globe and the bottom, with the lamp, as distinct and separate parts. This connection of the guard *a* with the dome *b* is clearly represented by Figure 1 of the drawing, while the globe or glass *c* and the bottom and lamp *d* and *e* are shown as separate pieces by Fig. 2.

Fig. 3 is a bottom view of the lamp and the flange that constitutes the bottom of the lantern, the spring-catches *f*, that secure the bottom to the lower ring or bar (the guard) being well shown by this figure. The lamp-pot *e* is thus placed low down in the lantern, so as to admit a free and uninterrupted current of air to the flame, and the curved flange surrounding it protects the pot, while it also forms the bottom *d* of the lantern. The flange *g*, extending upward in continuation of the sides of the pot, gives support to the bottom of the globe. Holes through the vertical flange admit air, and a hole, *h*, controlled by a sliding door, *i*, allows of the lighting of the lantern, this hole being in line with the slit in the burner, and there being in the bottom of the globe a recess, *j*, in continuation of the track or channel from the hole to the burner.

The bottom of the lantern, thus made up of the flanges and lamp-pot, is attached to the lower part of the guard by spring-catches *f*, the outer ends of these catches, which pass over the bar or rod of the guard, being shown projecting at *k*, in the lower portion of the parts represented by Fig. 2, the thumb-and-finger knobs *m*, with the interior part of the catches, being shown by Fig. 3.

It will be readily seen that the flanges *d* and *g* and oil-pot *e* are all united and form one piece, and form that part of the lantern located below the globe and guard.

This construction and arrangement of the parts of the lantern admit of easy handling of it, and every facility for attaching and detaching the several parts, and the replacing of any broken or injured piece, while it permits the removal of the lamp-pot and bottom as a whole, instead of requiring the two movements which have to be made when the bottom and the pot are of independent pieces and connected to each other as separate parts.

Having thus described my invention, what I claim as new, and desire to secure by Letters Patent, is—

1. Constructing a lamp-pot of a lantern with edge or sides extending above the top of the pot and forming a flange, *g*, the side and flange forming one piece, so that the globe of the lantern will rest upon this flange, substantially in the manner described.

2. The oil-pot *e*, having its sides *g* extended upward and perforated for air-passages, and provided with a flange, *d*, so as to form the base of a lantern in one piece, and combined with a detachable globe-guard, *a*, as set forth.

3. The hole *h*, with the sliding door *i*, in continuation with the recess *j* of the globe, for lighting the lamp, as herein described.

WILLIAM WESTLAKE.

Witnesses:

JAS. A. COWLES,

A. CHAPEL.